(12) United States Patent
San Martin et al.

(10) Patent No.: US 10,976,464 B2
(45) Date of Patent: Apr. 13, 2021

(54) GRADIENT INDUCTION LOGGING TOOL HAVING DIRECT FIELD CANCELATION WITH OPTIONAL COMPENSATION

(71) Applicant: HALLIBURTON ENERGY SERVICES, INC., Houston, TX (US)

(72) Inventors: Luis E. San Martin, Houston, TX (US); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 184 days.

(21) Appl. No.: 15/101,856

(22) PCT Filed: Dec. 26, 2013

(86) PCT No.: PCT/US2013/077741
§ 371 (c)(1),
(2) Date: Jun. 3, 2016

(87) PCT Pub. No.: WO2015/099716
PCT Pub. Date: Jul. 2, 2015

(65) Prior Publication Data
US 2016/0370488 A1    Dec. 22, 2016

(51) Int. Cl.
*G01V 3/28* (2006.01)
*E21B 47/12* (2012.01)
(Continued)

(52) U.S. Cl.
CPC .............. *G01V 3/28* (2013.01); *E21B 47/026* (2013.01); *E21B 47/13* (2020.05)

(58) Field of Classification Search
CPC ... G01V 3/28; G01V 3/38; G01V 3/30; G01V 3/32; G01V 3/26; G01V 3/108;
(Continued)

(56) References Cited

U.S. PATENT DOCUMENTS 3,051,892 A * 8/1962 Huston .................... G01V 3/28
324/221
6,865,455 B1 * 3/2005 Wiegert ............... G05D 1/0259
324/246
(Continued)

FOREIGN PATENT DOCUMENTS

WO    2015/099716    7/2015

OTHER PUBLICATIONS

PCT International Search Report and Written Opinion, dated Sep. 23, 2014, Appl No. PCT/2013/077741, Gradient Induction Logging Tool Having Direct Field Cancelation with Optional Compensation, Filed Dec. 16, 2013, 16 pgs.
(Continued)

*Primary Examiner* — Lee E Rodak
(74) *Attorney, Agent, or Firm* — John Wustenberg; C. Tumey Law Group PLLC (57) ABSTRACT

Direct field cancelation with optional receive antenna compensation is provided in at least some gradient induction logging tool embodiments. Illustrative embodiments include a spatial gradient antenna arrangement having multiple spatially-separated multi-component coil antennas and a multi-component coil antenna having bucking coils that cancel the effects of both the direct field and the gradient of the direct field on the receive signal. Other tool embodiments include a multi-component coil antenna and a spatial gradient antenna arrangement having spatially separated multi-component coil antennas with bucking coils that cancel the effects of both the direct field and the gradient of the direct field on the receive signal. Those embodiments employing a spatial gradient antenna arrangement for receiving may further be configured to provide compensated measurements by combining measurements from rotated orientations of the spatial gradient antenna. Systems and methods employing such tool embodiments may provide
(Continued)

increased induction logging tool functionality and enhanced measurement resolution.

20 Claims, 4 Drawing Sheets

(51) Int. Cl.
 *E21B 47/026* (2006.01)
 *E21B 47/13* (2012.01)
(58) Field of Classification Search
 CPC ... G01V 3/18; G01V 3/20; G01V 3/08; G01V 3/104; G01V 3/02; G01V 3/081; G01V 3/10; G01V 3/15; G01V 13/00; G01V 11/00; G01V 11/002; G01V 1/003; G01V 1/24; G01V 1/32; G01V 1/42; G01V 2210/30; G01V 2210/66; G01V 99/005; G01V 9/02; E21B 47/026; E21B 47/122; H01Q 1/04; H01Q 21/24; H01Q 21/20; H01Q 7/00; H01Q 7/08
 USPC .................................................. 324/338–343
 See application file for complete search history.

(56) References Cited

U.S. PATENT DOCUMENTS

| | | | | |
|---|---|---|---|---|
| 7,603,251 B1* | 10/2009 | Wiegert | ............... | G01V 3/081 702/152 |
| 7,937,221 B2 | 5/2011 | Zhdanov | | |
| 2003/0030439 A1* | 2/2003 | Gao | ............... | G01V 3/28 324/339 |
| 2003/0229450 A1* | 12/2003 | Strickland | ............... | G01V 3/28 702/10 |
| 2004/0059515 A1* | 3/2004 | Kennedy | ............... | G01V 3/28 702/7 |
| 2004/0207403 A1 | 10/2004 | Fanini et al. | | |
| 2005/0083061 A1* | 4/2005 | Tabanou | ............... | G01V 3/28 324/334 |
| 2005/0093547 A1* | 5/2005 | Xiao | ............... | G01V 3/28 324/339 |
| 2005/0122116 A1* | 6/2005 | Yu | ............... | G01V 3/28 324/339 |
| 2006/0043973 A1* | 3/2006 | Chen | ............... | G01V 3/30 324/339 |
| 2008/0074336 A1* | 3/2008 | Signorelli | ............... | G01V 3/28 343/719 |
| 2008/0211507 A1* | 9/2008 | Zhdanov | ............... | G01V 3/28 324/333 |
| 2009/0230968 A1* | 9/2009 | Bittar | ............... | E21B 47/024 324/338 |
| 2011/0095748 A1* | 4/2011 | Dvorak | ............... | G01V 3/104 324/76.39 |
| 2011/0267066 A1 | 11/2011 | Zhdanov | | |
| 2012/0143509 A1 | 6/2012 | Martin | | |
| 2014/0285206 A1* | 9/2014 | West | ............... | G01V 3/107 324/333 |

OTHER PUBLICATIONS

PCT International Preliminary Report on Patentability, dated Feb. 24, 2016, Appl No. PCT/US2013/077741, "Gradient Induction Logging Tool Having Direct Field Cancelation with Optional Compensation," filed Dec. 26, 2013, 10 pgs.

\* cited by examiner

GRADIENT INDUCTION LOGGING TOOL HAVING DIRECT FIELD CANCELATION WITH OPTIONAL COMPENSATION

BACKGROUND

Modern oil field operations demand a great quantity of information relating to the parameters and conditions encountered downhole. Such information typically includes characteristics of the earth formations traversed by the borehole, and data relating to the size and configuration of the borehole itself. The collection of information relating to conditions downhole, which commonly is referred to as "logging," can be performed by several methods including wireline logging and "logging while drilling" (LWD).

In wireline logging, a probe or "sonde" is lowered into the borehole after some or the entire well has been drilled. The sonde hangs at the end of a long cable or "wireline" that provides mechanical support to the sonde and also provides an electrical connection between the sonde and electrical equipment located at the surface of the well. In accordance with existing logging techniques, various parameters of the earth's formations are measured and correlated with the position of the sonde in the borehole as the sonde is pulled uphole.

In LWD, the drilling assembly includes sensing instruments that measure various parameters as the formation is being penetrated. While LWD techniques allow more contemporaneous formation measurements, drilling operations create an environment that is generally hostile to electronic instrumentation and sensor operations.

Induction logging tools have long been used in these and other logging environments. Induction logging tools typically employ transmit coils to generate eddy currents in the formation and receive coils to measure the magnetic fields resulting from those currents. Such measurements are known to be indicative of formation resistivity, but with the use of orthogonal coils to provide multi-component measurements and multiple signal frequencies to measure frequency dependence of the measurements, induction tools enable the determination of many formation model parameters including vertical and horizontal resistivity. In addition, there exists the possibility of improving the resolution of such formation models through the use of the gradient induction logging principle disclosed by M. Zhdanov in U.S. Pat. No. 7,937,221, "Method and Apparatus for Gradient Electromagnetic Induction Well Logging".

However, the actual implementation of a gradient induction logging tool faces certain obstacles. In particular, the gradient signal from the formation is expected to be significantly smaller than the normal induction tool response signal, raising the likelihood of the gradient induction logging tool response being dominated by the transmit antenna's magnetic field (the so-called "direct field"). Moreover, any feasible commercial tool design must cope with the extreme degree of temperature variations expected in the downhole environment and the commensurate changes in performance of receiver circuits designed for high sensitivity.

BRIEF DESCRIPTION OF THE DRAWINGS

Accordingly, there are disclosed in the drawings and the following description various gradient induction logging tools, systems, and methods having direct field cancelation with optional compensated receive antenna configuration. In the drawings:

FIGS. 3a-3c show various illustrative multi-component coil antennas.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

NOMENCLATURE

Certain terms are used throughout the following description and claims to refer to particular system components. This document does not intend to distinguish between components that differ in name but not function. The terms "including" and "comprising" are used in an open-ended fashion, and thus should be interpreted to mean "including, but not limited to . . . ". The term "couple" or "couples" is intended to mean either an indirect or direct electrical, mechanical, or thermal connection. Thus, if a first device couples to a second device, that connection may be through a direct connection, or through an indirect connection via other devices and connections. Conversely, the term "connected" when unqualified should be interpreted to mean a direct connection. For an electrical connection, this term means that two elements are attached via an electrical path having essentially zero impedance.

DETAILED DESCRIPTION

Disclosed herein are various electromagnetic gradient induction logging tools, systems, and methods having direct field cancelation with optional receive antenna compensation. At least some tool embodiments include a spatial gradient antenna arrangement having multiple spatially-separated multi-component coil antennas and a multi-component coil antenna having bucking coils that cancel the effects of both the direct field and the gradient of the direct field on the receive signal. Other tool embodiments include a multi-component coil antenna and a spatial gradient antenna arrangement having spatially separated multi-component coil antennas with bucking coils that cancel the effects of both the direct field and the gradient of the direct field on the receive signal. Still other tool embodiments employ spatial gradient antenna arrangements for transmitting and receiving, with at least one spatial gradient antenna arrangement having bucking coils that cancel the effects of both the direct field and the gradient of the direct field on the receive signal. Those embodiments employing a spatial gradient antenna arrangement for receiving may further be configured to provide compensated measurements by combining measurements from rotated orientations of the spatial gradient antenna. Systems and methods employing such tool embodiments are expected to provide increased induction logging tool functionality and enhanced measurement resolution.

Figure 1:
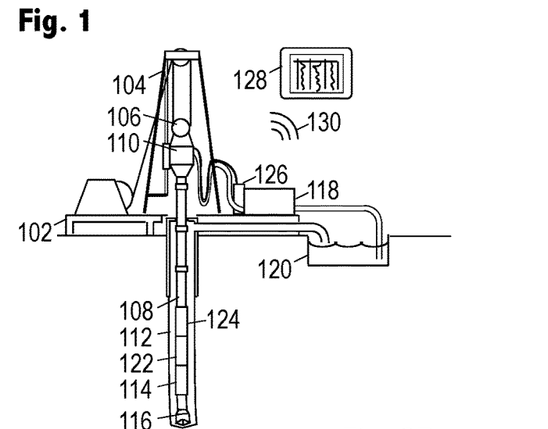
FIG. 1 shows an illustrative logging while drilling (LWD) environment.

The disclosed tools and methods are best understood in the context of the larger systems in which they operate. Accordingly, FIG. 1 shows an illustrative logging while drilling (LWD) environment. A drilling platform 102 supports a derrick 104 having a traveling block 106 for raising and lowering a drill string 108. A top drive 110 supports and rotates the drill string 108 as it is lowered into a borehole 112. The rotating drill string 108 and/or a downhole motor assembly 114 rotates a drill bit 116. As bit 116 rotates, it extends the borehole 112 through various subsurface formations. The motor assembly 114 may include a rotary steerable system (RSS) that enables the drilling crew to steer the borehole along a desired path. A pump 118 circulates drilling fluid through a feed pipe to the top drive assembly, downhole through the interior of drill string 108, through orifices in drill bit 116, back to the surface via the annulus around drill string 108, and into a retention pit 120. The drilling fluid transports cuttings from the borehole into the pit 120 and aids in maintaining the borehole integrity.

The drill bit 116 and motor assembly 114 form just one portion of a bottom-hole assembly that includes one or more drill collars (thick-walled steel pipe) to provide weight and rigidity to aid the drilling process. Some of these drill collars include built-in logging instruments to gather measurements of various drilling parameters such as position, orientation, weight-on-bit, borehole diameter, etc. The tool orientation may be specified in terms of a tool face angle (rotational orientation or azimuth), an inclination angle (the slope), and compass direction, each of which can be derived from measurements by magnetometers, inclinometers, and/or accelerometers, though other sensor types such as gyroscopes may alternatively be used. In one specific embodiment, the tool includes a 3-axis fluxgate magnetometer and a 3-axis accelerometer. As is known in the art, the combination of those two sensor systems enables the measurement of the tool face angle, inclination angle, and compass direction. Such orientation measurements can be combined with gyroscopic or inertial measurements to accurately track tool position.

A LWD gradient induction logging tool 122 may be integrated into the bottom-hole assembly. As the bit extends the borehole through the subsurface formations, tool 122 rotates and collects multi-component measurements of apparent resistivity (or measurements of complex impedance) and electromagnetic gradient that a downhole controller associates with tool position and orientation measurements. Multiple signal frequencies may optionally be employed to determine a frequency dependence of the multi-component gradient and apparent impedance measurements. The measurements can be stored in internal memory and/or communicated to the surface. A telemetry sub 124 may be included in the bottom-hole assembly to maintain a communications link with the surface. Mud pulse telemetry is one common telemetry technique for transferring tool measurements to a surface interface 126 and to receive commands from the surface interface, but other telemetry techniques can also be used.

A processing unit, shown in FIG. 1 in the form of a tablet computer 128, communicates with surface interface 126 via a wired or wireless network communications link 130, and provides a graphical user interface (GUI) or other form of interface that enables a user to provide commands and to receive and optionally interact with a visual representation of the acquired measurements. The measurements may be in log form, e.g., a graph of the measurement value as a function of position along the borehole. Alternatively, a parameterized formation model may be employed to invert the measurements and derive estimates of true formation properties such as the anisotropic resistivity and its high-resolution spatial dependence. Such information can be displayed in terms of a volumetric model that the user can section, rotate, zoom, and pan to study and analyze in detail. The processing unit can take alternative forms, including a desktop computer, a laptop computer, an embedded processor, a cloud computer, a central processing center accessible via the internet, and any combination of the foregoing.

Figure 2:
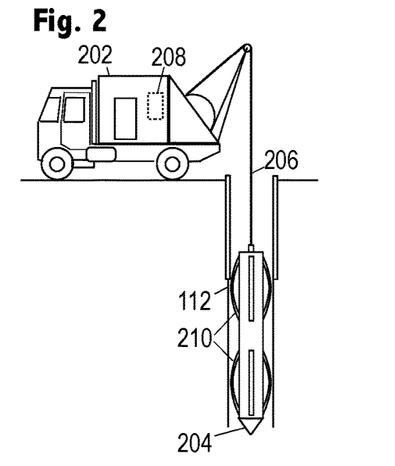
FIG. 2 shows an illustrative wireline logging environment.

At various times during the drilling process, the drill string 108 may be removed from the borehole, allowing wireline logging operations to be conducted as shown in FIG. 2. A logging truck 202 suspends a wireline logging tool 204 on a wireline cable 206 having conductors for transporting power to the tool and telemetry from the tool to the surface where a computer 208 acquires and stores measurement data from the logging tool 204 as a function of position along the borehole and as a function of azimuth. The logging tool 204 includes a gradient induction logging tool having sensing centralizers 210 that keep the tool centered as it is pulled uphole. As with the LWD tool assembly, the wireline tool assembly includes an orientation module and a control/telemetry module for coordinating the operations of the various instruments and communications between the various instruments and the surface.

The gradient induction LWD tool 122 or wireline tool 204 collects multi-component measurements of the electromagnetic field and the electromagnetic field gradient from the currents induced in the formation. The tool employs multi-component coil antennas for generating the magnetic fields that induce the formation currents and for detecting the responsive magnetic fields generated by these currents.

Figure 3A:
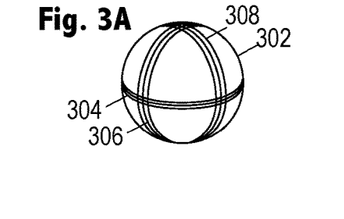

FIG. 3A shows a first illustrative multi-component coil antenna 302 having three orthogonal coils 304, 306, and 308. Each coil acts as a magnetic dipole antenna having a moment (for transmission) or sensitivity (for reception) along the coil's main axis. In the following explanatory material, it is often presumed that the coil axes are aligned with the tool axes, i.e., coil 304 is a coil having its main axis parallel to the tool's longitudinal axis (the "Z-axis"); coil 306 has its main axis parallel to the tool's X-axis, which is a line extended orthogonal from the Z-axis through the tool face scribe line; and coil 308 has its main axis parallel to the tool's Y-axis, which is perpendicular to both the X- and Z-axes. This presumption is not a requirement or limitation, as the measurements of such coils can be readily derived from the measurements of any three closely-spaced and linearly independent coils. Moreover, as shown in other Halliburton patents, it is possible under certain presumptions about the structure of the coupling matrix to obtain a full-rank coupling matrix measurement while omitting one or more coils from any given transmit-receive pairing of multi-component coil antennas.

Figure 3C:
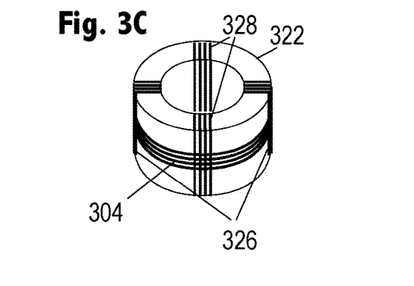

As suggested above, the multi-component coil antenna is not limited to the idealized form shown in FIG. 3A. FIG. 3B shows an alternative multi-component coil antenna 312 having the form of a cube with square coils 306, 306, and 308 oriented along the Z-, X-, and Y-axes, respectively. FIG. 3C shows yet another alternative embodiment 322 having a cylindrical form with a Z-axis coil 304, but having two X-axis coils 326 wound in parallel on opposite cylinder walls and two Y-axis coils 328 similarly wound on opposite cylinder walls, but rotationally offset from the X-axis coils by 90°. While the different variations may have certain potentially advantageous features (e.g., the hollow center of FIG. 3C permitting the use of a central wiring or flow channel), they may be considered interchangeable in terms of their electromagnetic transmission and reception characteristics. The use of any particular multi-component coil antenna in the following discussion is for illustrative purposes only and the suitability of other multi-component coil antennas should be recognized.

Figure 4A:
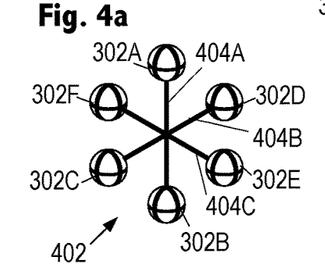
FIGS. 4a-4d show various spatial gradient antenna arrangements.

FIG. 4A shows a first illustrative spatial gradient antenna arrangement 402 having six spatially-separated multi-component coil antennas 302 for a total of 18 coils, yielding 18 respective coil signals that, for reasons explained further below, are preferably individually sensed and digitized. The spatial gradient antenna arrangement 402 includes rods 404 that provide spatial separation along three axes from a central point. It is noted here that rods shown here are for illustrative purposes. Any mechanical support that can substantially provide a prescribed distance and prescribed angle between different multi-component or single-component coil antennas can be used in the place of the rods. Rod 404A separates multi-component coil antennas 302A and 302B along the Z-axis, rod 404B separates multi-component coil antennas 302C and 302D along the X-axis, and rod 404C separates multi-component coil antennas 302E and 302F along the Y-axis. This spatial gradient antenna arrangement enables the Z-, X-, and Y-components of the gradient for each of the Z-, X-, and Y-components of the magnetic field to be measured, yielding 9 gradient-related measurements obtained by subtracting signals from corresponding coils on opposite ends of each rod. This subtraction is preferably done in the digital domain, i.e., after the coil signals have been digitized, though some contemplated embodiments perform this subtraction in the analog domain, e.g., by suitable wiring of the coils to the digital circuitry. Some embodiments further obtain measurements of the Z-, X-, and Y-components of the magnetic field from any one multi-component coil antenna or by adding the corresponding coil signals from multiple multi-component coil antennas or even all of the multi-component coil antennas.

Figure 4B:
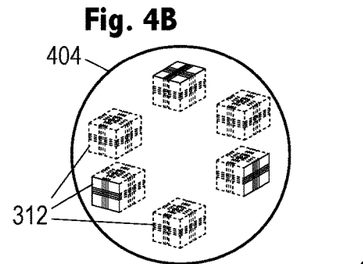
Figure 4C:
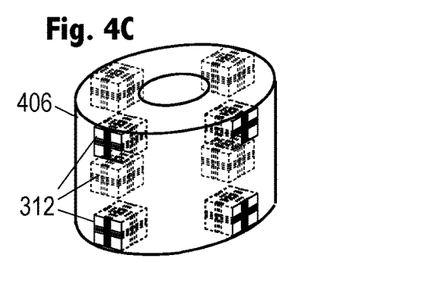

FIG. 4B shows a second illustrative spatial gradient antenna arrangement 404 having six multi-component coil antennas 312 embedded in non-magnetic sphere that provides pair-wise spatial separation along the three orthogonal axes. FIG. 4C shows a third illustrative spatial gradient antenna arrangement 406 having eight multi-component coil antennas 312 embedded in the walls of a cylindrical shell. The eight multi-component coil antennas are positioned at the corners of a virtual cube having six faces. A face-centric field measurement can be obtained by adding the corresponding coil signals from all four corners of each face. When differences are taken between the measurements for opposing faces, the 9 gradient-related measurements are obtained. As before, the 3 additional field component measurements can be obtained by summing the signals from all Z-component coils, by summing the signals from all X-component coils, and by summing the signals from all Y-component coils.

Figure 4D:
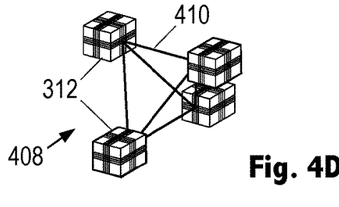

However, spatial gradient antenna arrangement 406 provides a significant degree of redundancy that may unnecessarily increase tool expense. FIG. 4D shows a spatial gradient antenna arrangement 408 having four multi-component coil antennas 312 positioned at the four vertices of a virtual tetrahedron. The six edges of the tetrahedron correspond to diagonals on the six faces of the virtual cube of FIG. 4C. An edge-centric field measurement can be obtained by adding the corresponding coil signals from the two vertices connected by the given edge. When differences are taken between the measurements for opposite edges, the 9 gradient-related measurements are obtained. As before, the 3 components of the field itself can be obtained by summing the signals from all Z-component coils, by summing the signals from all X-component coils, and by summing the signals from all Y-component coils.

While the different spatial gradient antenna arrangements may each have certain potentially advantageous features (e.g., the hollow center of FIG. 4C permitting the use of a central wiring or flow channel), they may be considered interchangeable in terms of their electromagnetic transmission and reception characteristics. The use of any particular spatial gradient antenna arrangement in the following discussion is for illustrative purposes only and the suitability of other arrangements should be recognized.

Figure 5A:
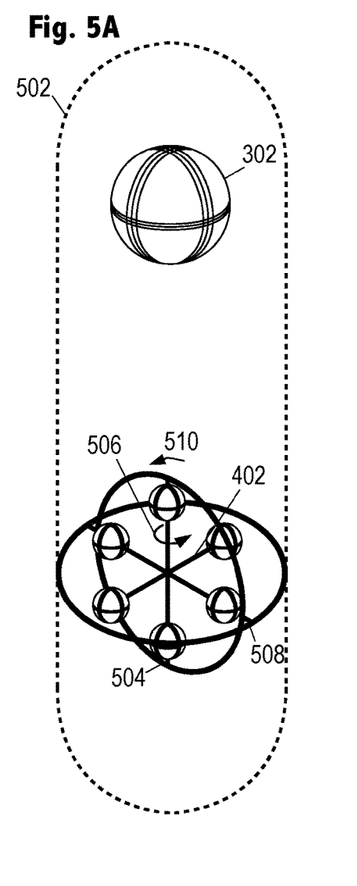
FIGS. 5a-5b show illustrative compensated gradient induction logging tools.

FIG. 5A shows an illustrative gradient induction logging tool 502 having a multi-component coil antenna 302 that transmits an electromagnetic signal and a spatial gradient antenna arrangement 402 that senses the 3 field components and the 9 field component gradient measurements in response to each coil of the transmit antenna, yielding a total of 9 field components and 27 field component gradient measurements, or 36 measurements, at each signal frequency. Tool 502 is able to compensate for drift in the electrical characteristics of the coils and receiver circuitry by enabling the spatial gradient antenna arrangement to rotate to exchange the positions of opposing multi-component coil antennas. Specifically, tool 502 includes a first gimbal 504 to enable the arrangement to rotate 506 about the Z-axis, enabling measurements to be acquired when multi-component coil antennas 302C and 302D (FIG. 3a) have been swapped and when multi-component coil antennas 302E and 302F have been swapped via a 180° rotation. The measurements taken before and after this rotation can be combined to mitigate or cancel phase measurement errors and magnitude ratio errors caused by temperature-dependent drift.

Denoting the original positions of two sensors 1 and 2 as A and B respectively, the measurements taken by the sensors (assuming the sensors are connected to rotation mechanism and thus rotate with the mechanism) can be expressed as:

$$S_{1A}=g_1H_A \text{ and } S_{2B}=g_2H_B$$

in the first orientation of the spatial gradient antenna arrangement, where $g_1$ and $g_2$ are the multiplicative gain drift for the first and second sensors and $H_A$ and $H_B$ are the fields at positions A and B respectively. When the sensors are swapped, the measurements become $$S_{1B}=-g_1H_B \text{ and } S_{2A}=-g_2H_A$$

The foregoing equations account for the 180° reversal of the sensors. A gradient calculation from the first orientation may be combined with the gradient calculation from the swapped orientation to yield:

$$\Delta H \sim [(S_{1A}-S_{2B})-(S_{2A}-S_{1B})]/2=(H_A-H_B)(g_1+g_2)/2$$

Similarly, the sensor measurements can be combined to obtain an average field:

$$<H> \sim [(S_{1A}+S_{2B})-(S_{2A}+S_{1B})]/4 = (H_A+H_B)(g_1+g_2)/2$$

The multiplicative gain error can be eliminated by taking the ratio of the gradient and the average field:

$$\Delta H/<H> = 2(H_A-H_B)/(H_A+H_B)$$

Such sensor position swapping can also be used to compensate for additive errors, though the precise compensation calculation depends on the desired measurement and the source of the additive error. For example, if the receiver electronics are the source of the additive error (meaning that the additive error's polarity is unchanged when the sensor orientations have swapped), the errors cancel in the average field calculation given above, but do not cancel in the gradient calculation. However, under these circumstances, an additional polarity change can be introduced by, e.g., swapping the inputs to the receiver electronics. This change, combined with the receiver's internal sign change for the gradient calculation, causes the additive errors to cancel in the gradient calculation. Of course both inverted and non-inverted measurements may be obtained to enable additive error cancelation in both the field and gradient calculations.

As an alternative, the sensors may be configured to rotate counter to the rotation mechanism in a manner that maintains a consistent sensor orientation. The gradient calculations for this configuration would also cause additive errors to cancel. Where both additive and multiplicative drift errors exist, the additive errors may be compensated prior to the multiplicative error compensation.

Returning to FIG. 5A, a second gimbal 508 enable the arrangement to rotate 510 about the Y-axis to exchange the positions of multi-component coil antennas 302A and 302B. Again, measurements taken before and after the exchange can be combined to provide drift-compensated measurements. It should be noted that with the gimbals 504, 508, it becomes possible to reduce the number of multi-component coil antennas from six to four, two, or even one, so long as the rotations can be performed rapidly enough to collect a full set of measurements at each position in the borehole. It is further noted that the duality principle enables the roles of transmitter and receiver to be switched, so that the multi-component coil antenna 302 becomes a receiving antenna and the coils in the spatial gradient antenna arrangement become transmitting elements. The duality principle applies to any of the other configurations described herein.

Tool 502 is a wireline logging tool. LWD tools typically have rotation about the Z-axis provided by the rotation of the drillstring, so that gimbal 504 may be omitted while still providing compensation by combining measurements taken at azimuthally-opposite orientations.

Figure 5B:
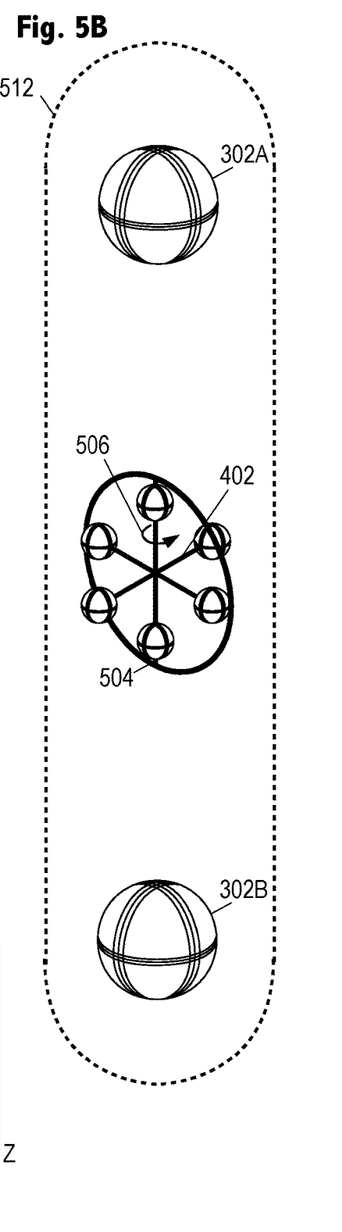

FIG. 5B shows another illustrative gradient induction logging tool 512 having two multi-component transmit coil antennas 302A, 302B on opposite sides of a spatial gradient sensing antenna arrangement 402. The two opposed multi-component transmit coil antennas enable compensation to be achieved along the Z-axis, so only one gimbal 504 is needed to provide rotation 506 around the Z-axis of a wireline tool. As before, gimbal 504 may be omitted in a LWD tool embodiment providing compensated measurements. With sufficiently rapid rotation, two or three of the multi-component coil antennas in the X-Y plane may be omitted.

Figure 6:
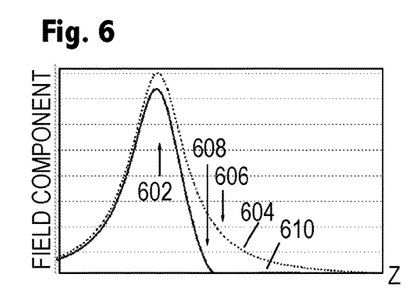
FIG. 6 is a graph comparing an illustrative field from a coil antenna with an illustrative field from a coil antenna arrangement having a suitably-positioned bucking coil.

Tools 502 and 512 may suffer from the overwhelming effects of a typical direct field. That is, the magnetic field emitted by the multi-component coil antenna 302 may be expected to be much larger than the magnetic fields from the induced currents in the formation, making it difficult to measure the formation signal components with adequate resolution to provide an accurate estimation of the formation properties. FIG. 6 is a graph of an illustrative magnetic field component as a function of position along the tool's longitudinal axis. The dotted line shows the field strength for a transmit coil located at position 602. The strength of this direct field remains substantial at the illustrative receive coil position 606. However, with an appropriately positioned bucking coil having a suitable inverse signal the direct field can be canceled at the receive coil position 606. The solid line 610 shows the field strength for a transmit coil located at position 602 and a bucking coil located at position 608 (about one quarter of the distance to the transmit coil). When the bucking coil provides an oppositely-oriented field, the field at the receive coil position 606 is completely canceled. Moreover, the gradient of the field at the receive coil position 606 is also zero. Cancelation of the direct field and direct field gradient is not limited to the illustrated configuration, but rather it can be obtained with a number of bucking coil configurations.

Direct field measured at an antenna due to another antenna at distance r, which is axially separated, is proportional to $1/r^3$. In a case main antenna is at distance $r_m$ from the transmitter with magnetic moment $M_m$, and bucking is at distance $r_b$ from the transmitter with magnetic moment $M_b$, cancellation of direct signal requires the condition: $M_b/r_b^3 = -M_m/r_m^3$. This requires the following ratio to be maintained between the magnetic moments of the antennas: $M_b/M_m = r_m^3/r_b^3$. This relationship can be maintained by adjusting the number of turns of the antennas, amount of current applied, or area of each antenna as suggested by M=IAN, where M is the magnetic moment, I is the current applied to the coil, A is the area of the coil, N is the number of turns. In case both the main and bucking coil measurements are separately taken, it is also possible to apply a scaling factor to one of the coil measurements synthetically to achieve the relationship above. However, in practice, a single measurement that is a combination of main and bucking measurements is made with the appropriate ratio electrically incorporated through number of turns and/or the area of coils. This is accomplished by connecting the bucking and main antennas in series with the appropriate number of turns that maintains the cancellation as described above.

Figures 7A, 7B:
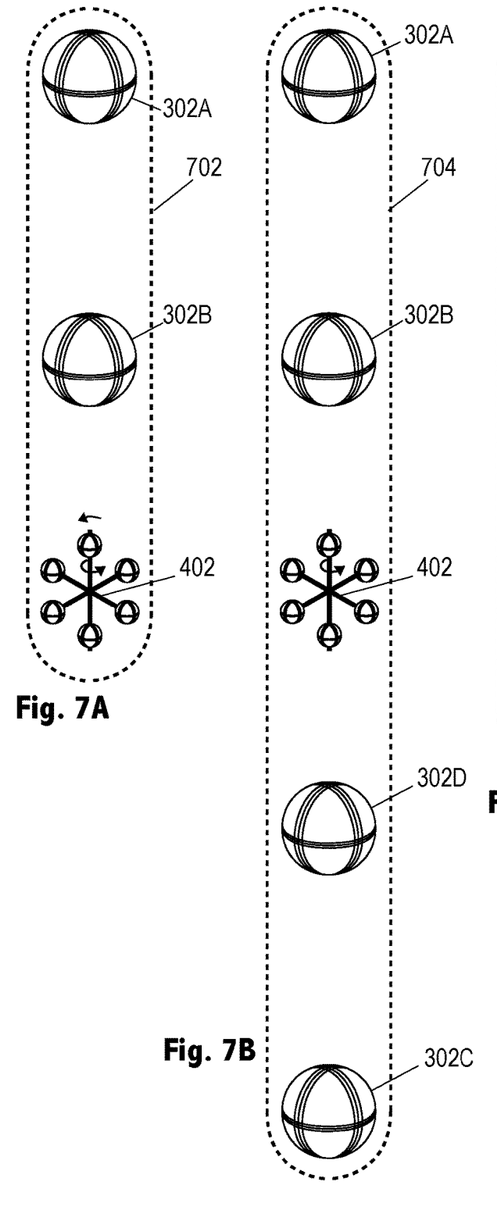
FIGS. 7a-7b show illustrative gradient induction tools having direct field cancelation via multi-component coil bucking coils.

FIG. 7A shows an illustrative gradient induction logging tool 702 having a multi-component coil transmit antenna 302A with bucking coils in the form of a second multi-component coil transmit antenna 302B, and further having a spatial gradient antenna arrangement 402 that provides the field component and field component gradient measurements described above. However, the bucking coils cancel the direct field and the gradient of the direct field at the position of the spatial gradient antenna arrangement, enabling these measurements to be measurements of the formation response to the transmitted signals. The spatial gradient antenna arrangement 402 may be rotatable to enable the tool to obtain compensated measurements as described previously.

FIG. 7B shows an illustrative gradient induction logging tool 704 having the multi-component coil transmit antenna 302A with bucking coil antenna 302B and having the spatial gradient antenna arrangement 402. Tool 704 further includes a second multi-component coil transmit antenna 302C with a bucking coil antenna 302D on the opposite side of the spatial gradient antenna arrangement 402 from antennas 302A and 302B. The bucking coil antennas provide the direct field cancelation and direct field gradient cancelation for their respective transmit antennas, enabling the spatial gradient antenna arrangement to obtain measurements of the formation response.

Figures 8A, 8B:
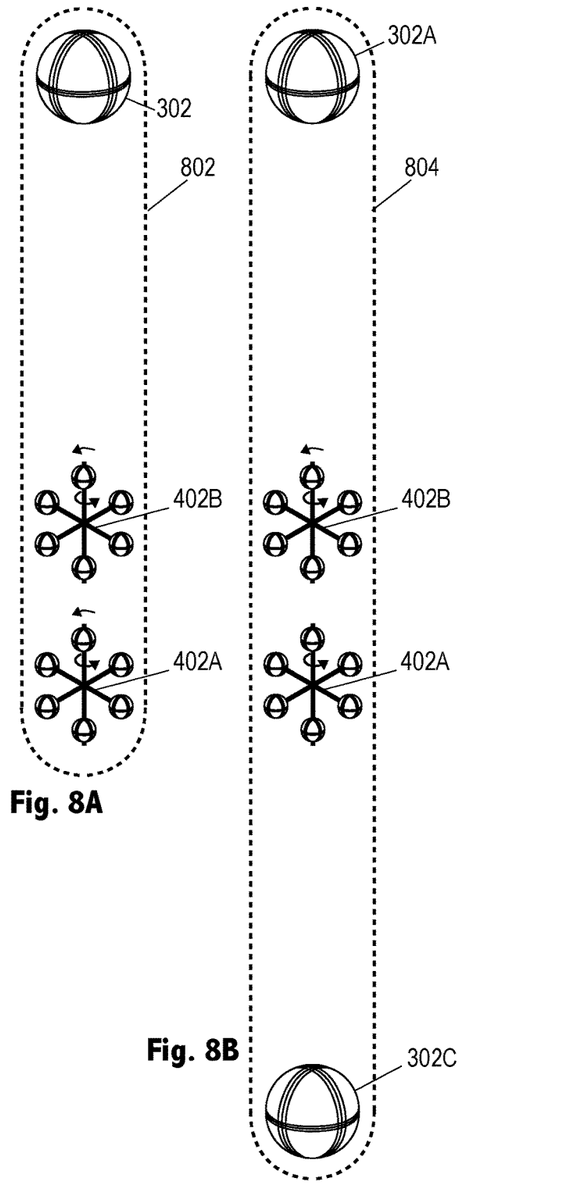
FIGS. 8a-8b show illustrative gradient induction tools having direct field cancelation via spatial gradient antenna bucking coils.

FIG. 8A shows an alternative gradient induction logging tool 802 having a multi-component coil transmit antenna 302 and a spatial gradient antenna arrangement 402A. Rather than a bucking coil for the transmit antenna, however, tool 802 includes a bucking coils for each of the receiver coils in the form of a second spatial gradient antenna arrangement 402B. The bucking coils may be wired in series with their respective coils in arrangement 402A to perform the cancelation of the direct field response in the analog domain. The arrangements may be rotatable to provide compensated measurements. FIG. 8B shows the related gradient induction logging tool 804 having opposed multi-component coil transmit antennas 302A and 302C, enabling compensated measurements to be obtained with rotation about the Z-axis only.

Figure 9:
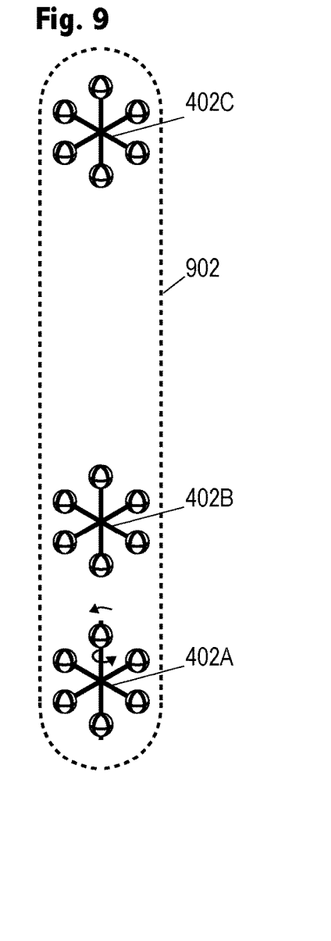
FIG. 9 shows an illustrative gradient induction tool having a spatial gradient transmit and receive antennas.

FIG. 9 shows another alternative spatial gradient induction logging tool 902 having a spatial gradient antenna arrangement 402C for transmitting signals, a spatial gradient antenna arrangement 402B for bucking, and a spatial gradient arrangement 402A for receiving. The receiving arrangement 402A may be rotatable to enable compensated measurements. To make this embodiment more feasible, a tetrahedral spatial gradient arrangement 408 (FIG. 4D) may be preferred for the transmitting, bucking, and receiving arrangements.

Figure 10:
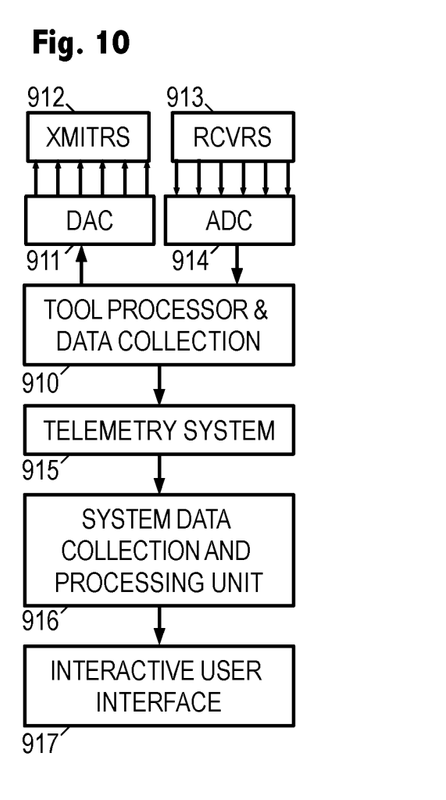
FIG. 10 is a function block diagram of an illustrative gradient induction logging system.

FIG. 10 is a function block diagram of an illustrative gradient induction logging system. An embedded tool controller 910 provides transmit signal waveforms to a digital-to-analog converter 911 that drives the transmit and bucking coils 912 to provide cancelation of the direct field and direct field gradient at the location of the receivers. Alternatively the cancellation is achieved by the controller 910 by synthetically adding signals from the main and bucking coils with appropriate coefficients. Receiver coils 913 provide formation response signals to a digital to analog converter 914. The embedded controller 910 stores and optionally processes the digitized measurements, e.g., to obtain compensated measurements, differences representing gradients, and sums representing field components. Multiple closely-spaced measurements may be combined to improve signal to noise ratio. If the waveforms have multiple frequencies, the embedded controller may determine measurement values for each of the multiple frequencies. The processed and/or unprocessed measurements are communicated to the surface by a telemetry system 915, which in some cases is a communications link established with the tool memory after the tool has been retrieved to the surface. In other implementations, the telemetry system 915 operates over a wireline cable or a mud-pulse telemetry channel.

A processing unit 916 on the surface collects and processes the measurement data alone or in combination with information from other sources to provide a log of formation properties including anisotropic resistivity. As previously discussed, the surface processing unit may take the form of a computer in a wireline truck or mounted on a logging skid to collect the measurement data. The computer collects and processes the data in accordance with its installed software to invert the tool measurements into model parameters as a function of position along the borehole. A user interface 917 enables a user to view and optionally interact with a visual representation of the formation property logs, e.g., by adjusting the position, size, scale, and color. The log may be displayed and updated as the data is collected. In some systems, the driller views the logs and other available operations data and uses them to steer the drill string into productive formations. In other systems, completions engineers analyze the logs and other available survey data to construct a completion plan, including perforation regions, isolation packers, and controlled flow paths.

Figure 11:
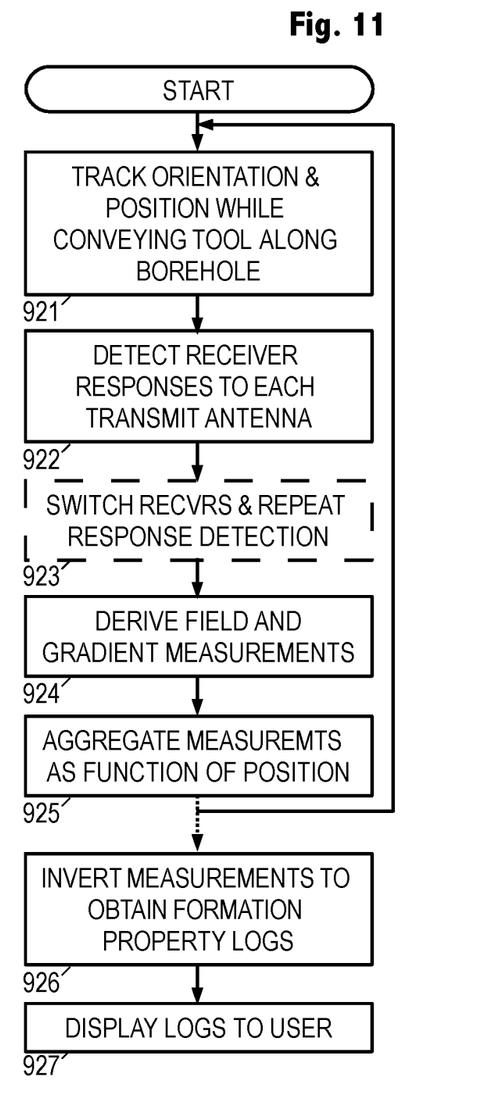
FIG. 11 is a flow diagram of an illustrative gradient induction logging method.

FIG. 11 shows a flow diagram of an illustrative gradient induction logging method. In block 921, the gradient induction logging tool is conveyed along a borehole while its position and orientation are tracked. For LWD, the tool is part of the bottom hole assembly and is used to perform logging while drilling. For wireline logging, the tool is part of a sonde that is lowered to the bottom of the region of interest and the sensing surfaces are deployed to contact the wall and perform logging as the logging tool is pulled uphole at a steady rate.

To perform logging, an electrical current is supplied to each of the transmit coils in turn and the corresponding responses of each of the receive coils measured in block 922. For compensated measurements, the receive coils in block 923 may be rotated into opposing positions and/or opposing transmitters driven to obtain measurements in which the sign of the formation response is inverted while preserving the sign of any systematic error attributable to drift in the electrical characteristics of the receivers. The coil signals are combined in block 924 to obtain the desired field component and field component gradient measurements. The system may employ the ratio between the applied signal and the measured responses to derive coupling component values which can be aggregated with nearby measurements in block 925 to obtain an improved formation property estimate. Blocks 921-925 are repeated until the region of interest has been logged. During or after the logging operation, the system employs a parameterized model in block 926 to invert the measurements and thereby derive estimates of the formation properties of interest, including resistive anisotropy, dip, and strike. In block 927, the system displays the formation property logs to a user.

The above-described tool embodiments can function in both oil-based and water-based borehole fluids, though it is expected that tools designed for use in oil-based fluids will generally speaking employ larger signal amplitudes and higher signal frequencies than tools designed from use in water-based borehole fluids. The number and spacing of the multi-component coil antennas and spatial gradient antenna arrangements can be varied to provide additional depths of investigation, different sensing volumes, and different tolerances for borehole effects. Though tool embodiments having one bucking coil per transmit antenna coil have been shown and may be preferred, this is not a design requirement. Multiple bucking coils can be employed to provide additional control over the shape of the transmitted field while simultaneously enabling control over the direct fields at the receiver location(s).

Numerous variations and modifications will become apparent to those skilled in the art once the above disclosure is fully appreciated. For example, the reciprocity principle in many cases enables the same measurements to be obtained with the roles of the transmitting and receiving coils exchanged. As another example, the foregoing explanation shows the use of collocated coils for the multi-component coil antennas, yet the coils need not be collocated to provide multi-component operation. It is intended that the following claims be interpreted to embrace all such variations and modifications where applicable.

What is claimed is:

1. A gradient induction logging tool that comprises:
   a multi-component coil transmit antenna having one bucking coil associated with each component of the multi-component coil transmit antenna; and
   a spatial gradient antenna arrangement of only four multi-component coil receive antennas at the vertices of a virtual tetrahedron,
   wherein the bucking coils cancel a direct field for each of the four multi-component coil receive antennas and cancel a direct field gradient from the multi-component coil transmit antenna at the spatial gradient antenna arrangement;
   an embedded tool controller configured to transmit signal waveforms to a digital-to-analog converter that drives the multi-component coil transmit antenna and the bucking coils, to cancel the direct field and the direct field gradient at locations of the four multi-component coil receive antennas; and
   one or more gimbals to rotate the spatial gradient antenna arrangement about at least one axis to enable the tool to mitigate or cancel phase measurement errors and magnitude ratio errors caused by temperature-dependent drift.

2. The tool of claim 1, wherein the multi-component coil transmit antenna has orthogonal coils with at least one coil aligned with a longitudinal axis of the tool.

3. The tool of claim 1, wherein the spatial gradient antenna arrangement is centered between the multi-component coil transmit antenna and a second multi-component coil transmit antenna.

4. The tool of claim 1, wherein a gimbal is rotatable about the z-axis to enable the tool to mitigate or cancel the phase measurement errors and the magnitude ratio errors caused by the temperature-dependent drift.

5. The tool of claim 1, wherein a gimbal is rotatable about the y-axis to enable the tool to mitigate or cancel the phase measurement errors and the magnitude ratio errors caused by the temperature-dependent drift.

6. The tool of claim 1, wherein a first gimbal is rotatable about the z-axis and wherein a second gimbal is rotatable about the y-axis to enable the tool to mitigate or cancel the phase measurement errors and the magnitude ratio errors caused by the temperature-dependent drift.

7. A gradient induction logging tool that comprises:
   a spatial gradient antenna arrangement having multiple spatially-separated multi-component coil transmit antennas having one bucking coil associated with each component of the antennas in said arrangement, wherein the spatial gradient antenna arrangement comprises a support structure which maintains a spatial separation between the multi-component coil transmit antennas at a fixed distance;
   a multi-component coil receive antenna, wherein the spatial gradient antenna arrangement is of only four multi-component coil receive antennas at the vertices of a virtual tetrahedron;
   wherein the bucking coils cancel a direct field for each of the four multi-component coil receive antennas and cancel a direct field gradient from each of the transmit antennas at the multi-component coil receive antenna;
   an embedded tool controller configured to transmit signal waveforms to a digital-to-analog converter that drives the multi-component coil transmit antenna and the bucking coils, to cancel the direct field and the direct field gradient at locations of the four multi-component coil receive antennas; and
   one or more gimbals to rotate the spatial gradient antenna arrangement about at least one axis to enable the tool to mitigate or cancel phase measurement errors and magnitude ratio errors caused by temperature-dependent drift.

8. The tool of claim 7, wherein the multi-component coil receive antenna has orthogonal coils with at least one coil aligned with a longitudinal axis of the tool.

9. The tool of claim 7, wherein the spatial gradient antenna arrangement includes two multi-component coil transmit antennas on a rotatable element that varies a direction of the separation between the two multi-component coil transmit antennas among multiple orthogonal axes.

10. The tool of claim 7, wherein the spatial gradient antenna arrangement is centered between the multi-component coil receive antenna and a second multi-component coil receive antenna.

11. The tool of claim 7, wherein a gimbal is rotatable about the z-axis to enable the tool to mitigate or cancel the phase measurement errors and the magnitude ratio errors caused by the temperature-dependent drift.

12. The tool of claim 7, wherein a gimbal is rotatable about the y-axis to enable the tool to mitigate or cancel the phase measurement errors and the magnitude ratio errors caused by the temperature-dependent drift.

13. The tool of claim 7, wherein a first gimbal is rotatable about the z-axis and wherein a second gimbal is rotatable about the y-axis to enable the tool to mitigate or cancel the phase measurement errors and the magnitude ratio errors caused by the temperature-dependent drift.

14. A gradient induction logging method that comprises:
   conveying a gradient induction logging tool along a borehole, the gradient induction logging tool having one bucking coil associated with each component of a multi-component coil transmit antenna and a spatial gradient antenna arrangement of only four multi-component coil receive antennas at the vertices of a virtual tetrahedron, wherein the bucking coils cancel a direct field for each of the four multi-component coil receive antennas and cancel a direct field gradient for the multi-component coil transmit antenna;
   rotating the spatial gradient antenna arrangement with one or more gimbals about at least one axis to enable the tool to mitigate or cancel phase measurement errors and magnitude ratio errors caused by temperature-dependent drift;
   transmitting signal waveforms to a digital-to-analog converter that drives the multi-component coil transmit antenna and the bucking coils, to cancel the direct field and the direct field gradient at locations of the four multi-component coil receive antennas;
   obtaining multi-component measurements of a formation response field gradient as a function of position along the borehole;
   combining measurements taken before and after a rotation to compensate for temperature-dependent drift;
   deriving from the multi-component measurements a formation property as a function of position; and
   displaying the formation property as a function of position.

15. The method of claim 14, wherein the formation property comprises at least one of: a vertical resistivity, a horizontal resistivity, a resistive anisotropy indicator, and a formation dip angle.

16. The method of claim 14, wherein the at least one bucking coil cancels a direct field and direct field gradient from the spatial gradient antenna arrangement of multi-component coil transmit antennas.

17. The method of claim 14, wherein said obtaining includes rotating the spatial gradient antenna arrangement to place the multi-component coil receive antennas on opposite ends of at least one spatial separation along an axis.

18. The method of claim 14, further comprising rotating a gimbal about the z-axis to enable the tool to mitigate or cancel the phase measurement errors and the magnitude ratio errors caused by the temperature-dependent drift.

19. The method of claim 14, further comprising rotating a gimbal about the y-axis to enable the tool to mitigate or cancel the phase measurement errors and the magnitude ratio errors caused by the temperature-dependent drift.

20. The method of claim 14, further comprising rotating a first gimbal about the z-axis and rotating a second gimbal about the y-axis to enable the tool to mitigate or cancel the phase measurement errors and the magnitude ratio errors caused by the temperature-dependent drift.

* * * * *